(12) United States Patent
Paparizos et al.

(10) Patent No.: US 8,447,736 B2
(45) Date of Patent: *May 21, 2013

(54) GRAMMAR COMPRESSION

(75) Inventors: Stelios Paparizos, San Jose, CA (US);
Christopher Walter Anderson, Redmond, WA (US); Wei Liu, Bellevue, WA (US); Ajay Nair, Redmond, WA (US); Alexandros Ntoulas, Mountain View, CA (US); Naga Srinivas Vemuri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/221,227

(22) Filed: Aug. 30, 2011

(65) Prior Publication Data

US 2011/0313993 A1 Dec. 22, 2011

(51) Int. Cl.
*G06F 11/14* (2006.01)
*G06F 17/30* (2006.01)
*G06F 11/00* (2006.01)
*G06F 11/20* (2006.01)
*G06F 13/00* (2006.01)

(52) U.S. Cl.
USPC ........................................................ 707/665

(58) Field of Classification Search
USPC ....... 707/665, 693, 706; 341/50, 51; 717/142, 717/143; 375/240; 715/242
See application file for complete search history.

(56) References Cited

U.S. PATENT DOCUMENTS

| | | | |
|---|---|---|---|
| 5,642,519 A | 6/1997 | Martin | |
| 5,678,052 A | 10/1997 | Brisson | |
| 6,298,354 B1 | 10/2001 | Saulpaugh | |
| 6,449,589 B1 | 9/2002 | Moore | |
| 6,762,699 B1 * | 7/2004 | Yang | 341/51 |
| 6,785,643 B2 | 8/2004 | Hayosh | |
| 6,999,931 B2 | 2/2006 | Zhou | |
| 7,126,500 B2 | 10/2006 | Adams | |
| 7,283,959 B2 | 10/2007 | Schmid | |
| 2006/0129396 A1 | 6/2006 | Ju | |
| 2006/0277032 A1 | 12/2006 | Hernandez | |
| 2007/0043566 A1 | 2/2007 | Chestnut | |
| 2008/0208821 A1* | 8/2008 | Chang et al. | 707/3 |

OTHER PUBLICATIONS

Charikar et al., Approximating the Smallest Grammar: Kolmogorov Complexity in Natural Models, http://www-win.compression.graphicon.ru/download/articles/grammar/charikar_2002_approximating_the_smallest_grammar.pdf, Feb. 20, 2002.

(Continued)

*Primary Examiner* — Usmaan Saeed
*Assistant Examiner* — Cecile Vo
(74) *Attorney, Agent, or Firm* — Shook Hardy & Bacon LLP

(57) ABSTRACT

Compression of extensive, rule-based grammars used to facilitate search queries is provided herein. Rule-based grammars include a list of rules that each comprise a sequence of token classes. Each token class is a logical grouping of tokens, and each token is a string of characters. A grammar is parsed to identify rules and token classes. Unimportant token classes are identified and sets of unimportant token classes are merged to generated merged token classes. A compressed grammar is generated by substituting the merged token classes into the grammar for corresponding unimportant token classes used to generate the merged token classes.

19 Claims, 4 Drawing Sheets

OTHER PUBLICATIONS

Smith et al., Language Evolution in Populations: Extending the Iterated Learning Model, http://citeseer.ist.psu.edu/cache/papers/cs/27310/http:zSzzSzwww.ling.ed.ac.ukzSz~kennyzSzpublicationszSzsmith_hurford_language.pdf/language-evolution-in-populations.pdf, Sep. 2003.

Nonfinal Office Action, mailed Dec. 21, 2010, in U.S. Appl. No. 12/147,211, 19 pp.

Notice of Allowance, mailed May 26, 2011, in U.S. Appl. No. 12/147,211, 22 pp.

* cited by examiner

GRAMMAR COMPRESSION

CROSS-REFERENCE TO RELATED APPLICATIONS

This application is a continuation of U.S. patent application Ser. No. 12/147,211, now U.S. Pat. No. 8,027,957, filed Jun. 26, 2008, which is herein incorporated by reference in its entirety.

BACKGROUND

Some search engines employ rule-based grammars to route queries to corresponding domains of information to provide, for instance, instant answers for query searches. Instant answers are information provided in response to a search query in addition to typical search result that allow the user to quickly find information that they are seeking without having to sift through search results. The rule-based grammars may be used to classify search queries received at a search engine, annotate the queries, and route the queries to appropriate data sources to find and return results for the queries. For instance, suppose a user enters the search query: "weather in Seattle." A grammar may be used to identify that Seattle is a city and weather is a keyword. The grammar may also be used to identify an appropriate data source to provide an answer (e.g., a data source containing weather information) and assists in evaluating the query to provide an appropriate response. Accordingly, by employing a grammar, weather information for Seattle could be provided as an instant answer to the search query in addition to traditional web page search results.

Grammars can be generated manually by domain experts or automatically. Most grammars used are relatively large with multiple rules and combinations of items. Optimizing such grammars to provide, for instance, instant answers to search queries has been a very difficult task. Compressing a grammar is usually not an issue for compilers, because grammar sizes are small and highly optimized with extensive iterations by experts. But for instant answers, there may be many different grammars for many different answers. Most of these grammars can be large and inefficient.

SUMMARY

This Summary is provided to introduce a selection of concepts in a simplified form that are further described in the Detailed Description. This Summary is not intended to identify key features or essential features of the claimed subject matter, nor is it intended to be used as an aid in determining the scope of the claimed subject matter.

Embodiments of the present invention generally relate to reorganizing and compressing rule-based grammars for query searches. A grammar includes a list of rules for matching queries. Each rule includes a sequence of token classes, which are each a logical grouping of tokens, which, in turn, are each a sequence of characters. An extensive rule-based grammar is parsed to identify rules and token classes. Unimportant token classes are identified and merged to form merged token classes. A compressed grammar is generated by substituting the merged token classes into the grammar for the unimportant token classes used to generate the merged token classes.

BRIEF DESCRIPTION OF THE DRAWINGS

The present invention is described in detail below with reference to the attached drawing figures, wherein.

DETAILED DESCRIPTION

Figure 1:
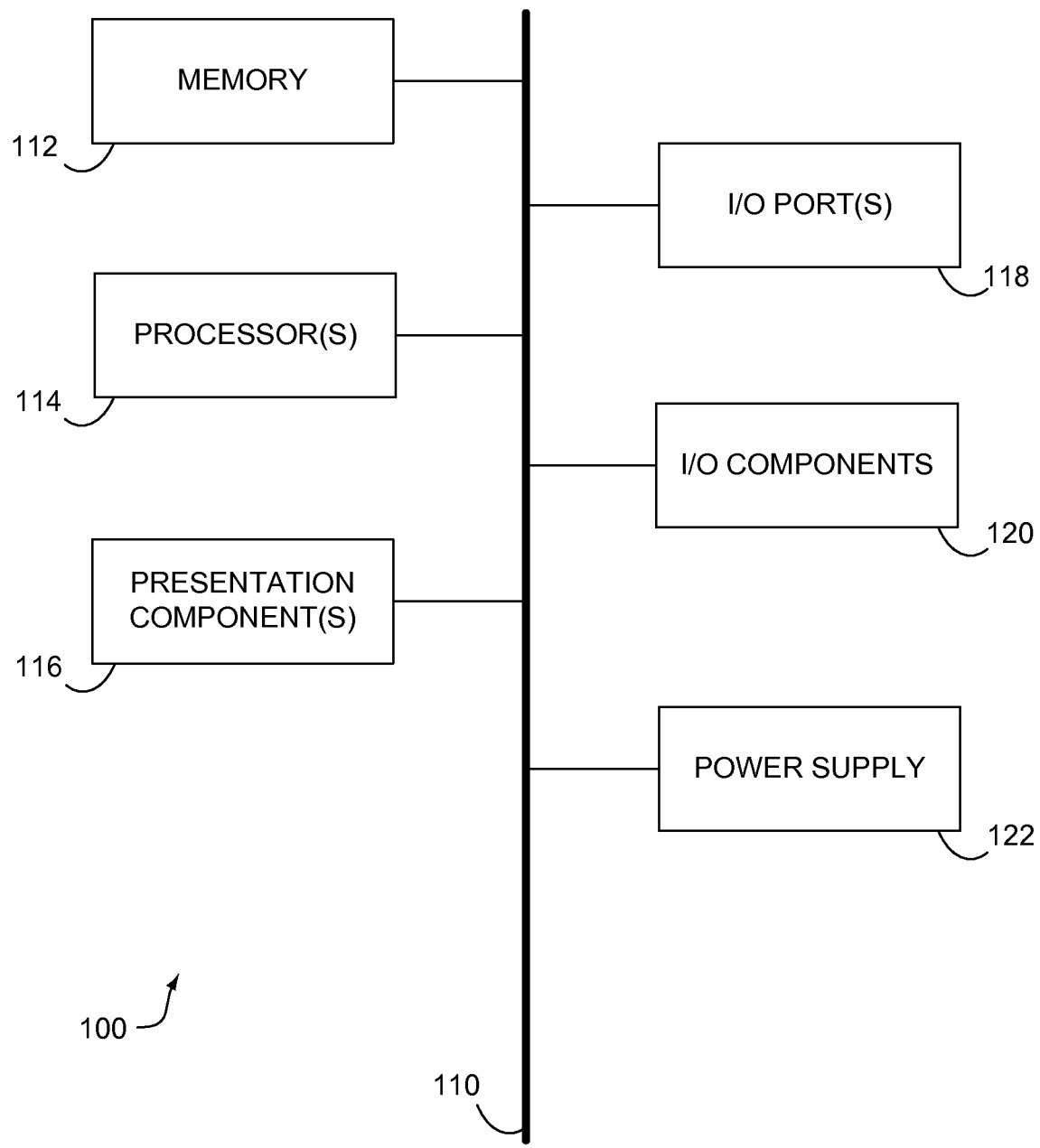
FIG. 1 is a block diagram of a computing system environment suitable for use in implementing the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are generally directed to compressing extensive, rule-based grammars used for query search. Compressing these extensive grammars in query search facilitates responsiveness. Accordingly, in one aspect, an embodiment of the present invention is directed to a method for compressing a grammar. The method includes receiving a grammar, the grammar including a number of rules and the rules including a number of token classes. The method also includes parsing the grammar to identify the rules within the grammar and the token classes within the rules. The method next includes identifying, from the token classes, unimportant token classes that are eligible for compression and analyzing the unimportant classes to identify subsets of unimportant token classes as a candidate subset for compression. The method further includes merging the unimportant token classes from the candidate subset to generate a merged token class. The method still further includes substituting the merged token class in the grammar for the unimportant token classes from the candidate subset to generate a compressed grammar.

In another embodiment, an aspect is directed to one or more computer-storage media embodying computer-useable instructions that, when employed by a computing device, cause the computing device to perform a method. The method includes receiving a grammar usable by a search engine to route search queries to corresponding domains of information to find and return information for the search queries, the grammar comprising a plurality of rules, each rule comprising a sequence of token classes. The method also includes parsing the grammar to identify the rules and token classes and identifying, from the token classes, unimportant token classes that are eligible for compression and important token classes that are not eligible for compression. The method next includes breaking the rules into sub-rules based on important token classes, wherein each sub-rule includes a portion of the token classes from the rules. The method also includes analyzing the sub-rules to identify sets of sub-rules as compression candidates and analyzing the unimportant token classes in the sets of sub-rules to identify unimportant token classes for compression. The method further includes merging the unimportant token classes from the sets of sub-rules to generate a merged token class. The method still further includes generating a compressed grammar by substituting the merged token class in the grammar for the unimportant token classes that were merged to generate the merged token class.

A further embodiment of the present invention is directed to one or more computer-storage media embodying computer-useable instructions that, when employed by a computing device, cause the computing device to perform a method. The method includes receiving a grammar usable by a search engine to route search queries to corresponding domains of information to find and return information for the search queries, the grammar comprising a number of rules, each rule comprising a sequence of token classes used to describe search queries, each token class comprising a logical grouping of tokens, each token comprising a string of one or more characters. The method includes parsing the grammar to identify the plurality of rules and token classes and eliminating, from the grammar, any duplicate rules identified from parsing the grammar. The method further includes assigning a score to each rule indicative of an importance of each rule to the grammar, wherein the score for each rule is based at least in part on the frequency with which each rule corresponds with search queries contained in query logs; identifying some rules as important rules based on the rules having a high score indicative of a high importance to the grammar; and removing the important rules from consideration for compression. The method also includes identifying, from the token classes, unimportant token classes that are eligible for compression and important token classes that is not eligible for compression; and breaking the rules into sub-rules based on important token classes, wherein each sub-rule begins and ends with an important token class and wherein a beginning token class and ending token class in each rule is treated as an important token class for purposes of breaking each rule into the sub-rules. The method further includes identifying sub-rules containing only important token classes and removing the sub-rules containing only important token classes from consideration for compression. The method also includes eliminating, from the grammar, any duplicate sub-rules identified. The method further includes analyzing the sub-rules to identify sets of sub-rules as compression candidates and analyzing the unimportant token classes in the sets of sub-rules to identify unimportant token classes for compression. The method also includes merging the unimportant token classes from the sets of sub-rules to generate a merged token class. The method further includes substituting the merged token class in the grammar for the unimportant token classes that were merged to generate the merged token class and eliminating any duplicate sub-rules and any duplicate rules after substituting the merged token classes in the grammar to generate a compressed grammar.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks, or implement particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, etc. I/O ports 118 allow computing device 100 to be logically coupled to other devices including I/O modules 120, some of which may be built in. Illustrative modules include a microphone, joystick, game pad, satellite dish, scanner, printer, wireless device, etc.

Embodiments of the present invention are generally directed to compressing extensive, rule-based grammars used for query search. The grammars that may be compressed include grammars generated manually by domain experts or automatically-generated grammars. In accordance with embodiments, an input grammar is compressed into an optimal grammar for query searches. The compression can be done on a single grammar or multiple grammars to generate a single, optimized grammar. In some embodiments, certain aspects of the grammar are taken into consideration in order not to distort the intent of the grammar. For instance, weighting/importance of items within the grammar (e.g., whether items within the grammar are essential to the intent of the grammar) may be used in determining whether to compress items, and the position of items within a grammar may be preserved during compression.

As discussed above, grammars are often used by search engines to route queries to corresponding domains of information to provide, for instance, instant answers for query searches. The grammars may be used to classify search queries received at a search engine, annotate the queries, and route the queries to appropriate data sources to find and return results for the queries.

As used herein, a grammar is a set or list of one or more patterns or rules. Rules or patterns will be used interchangeably herein. Each rule is a sequence of token classes in a particular order that is used to describe queries. A token class is a logical grouping of tokens, and each token is a string of one or more characters and could include a sequence of words, numbers, symbols letters, etc. By way of example, a token could be a particular basketball player, such as "Michael Jordan." The token could then be included in a corresponding token class, such as "basketball players," which would include a list of tokens representing basketball players (e.g., Michael Jordan, Larry Bird, Julius Erving, etc.). The token class, "basketball players" could then be included in a rule within a grammar to assist matching the grammar to search queries.

By constructing grammars in this manner, the grammars may match various queries submitted by users. For instance, a grammar may include the following rule: <product><f1><price>, in which <product> is a token class representing a list of products; <price> is token class representing a number annotated with $; and <f1> is a token class representing operators, such as, for instance, greater than, less than, equal to, etc. Based on this rule and its token classes, the grammar may match with a variety of search queries, such as, for instance: "digital cameras over $100", "mp3 players under $300", "cell phones around $150."

Embodiments of the present invention compress grammars by, among other things, identifying token classes within rules that may be merged together, thereby reducing the number of token classes used by the grammar and, in some instances, reducing the number of rules within the grammar. By way of illustration, below is a simplistic grammar compression example in which the following three rules are compressed:
Rule 1=<product><f1><price>
Rule 2=<product><f2><price>
Rule 3=<product><f3><price>

In each of the rules above: <product> is a token class representing a list of products; <price> is token class representing a number annotated with $; and <f1>, <f2>, and <f3> are token classes representing operators in which <f1>=over, greater than, <f2>=around, near and <f3>=under, smaller, less than. By analyzing the three rules above, it may be determined that the token classes, <f1>, <f2>, and <f3>, are candidates for compression. As such, the token classes may be merged to a new token class <n1>, where <n1> is the union of the three token classes (e.g., <f1> (union) <f2> (union) <f3>). The three rules may then be compressed to a single rule: <product><n1><price>. Although this is a simplified example showing compression on three rules, this compression may be done algorithmically, for instance, on a grammar with thousands of rules to reduce it to tens of rules.

Figure 2:
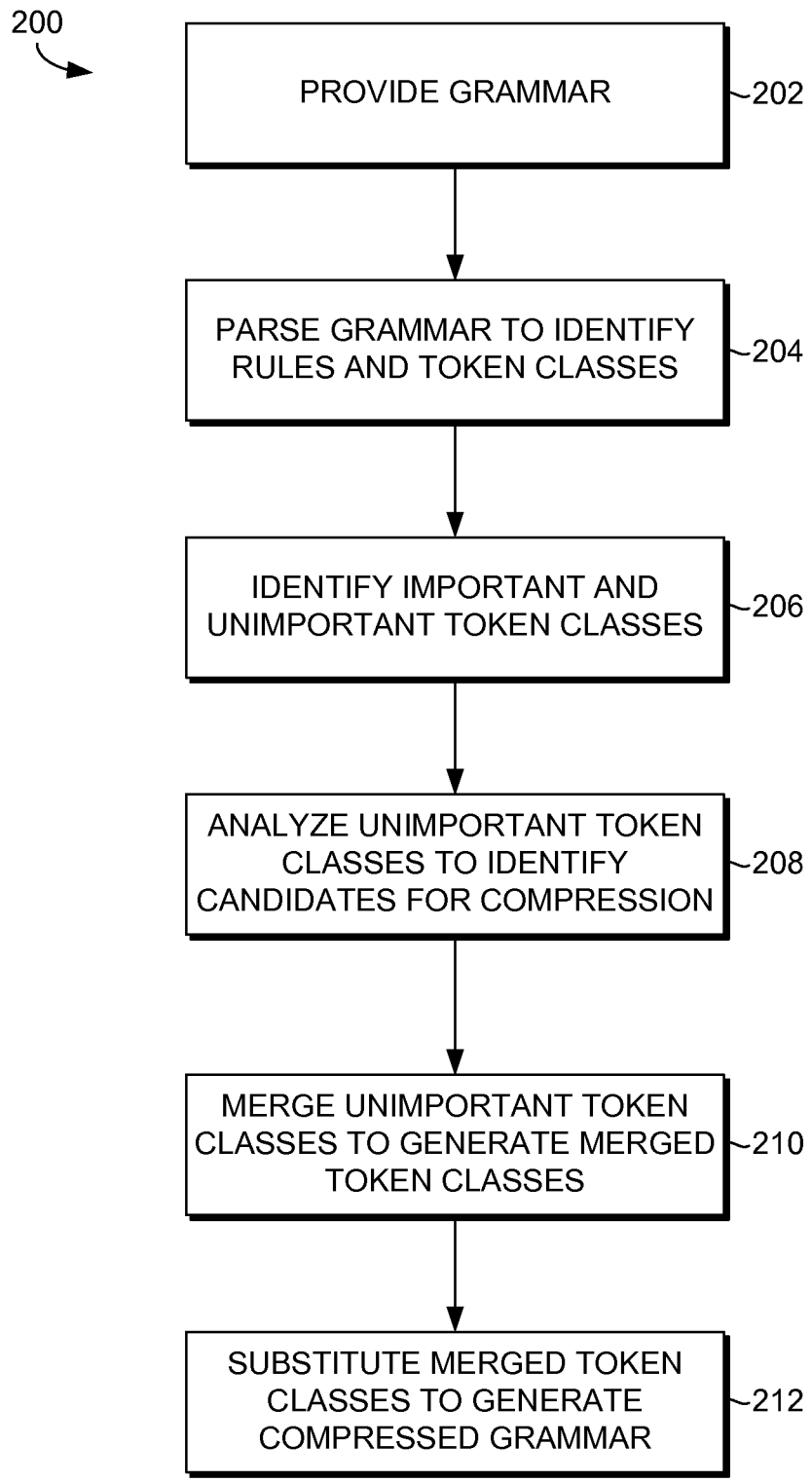
FIG. 2 is a flowchart illustrating a general, overview method in which a rule-based grammar is compressed by merging unimportant token classes in accordance with an embodiment of the present invention.

Referring now to FIG. 2, a flow diagram is provided that illustrates an overall method 200 for grammar compression in accordance with an embodiment of the present invention. Initially, as shown at block 202, a grammar is provided. The grammar may be a manually-generated or an automatically-generated grammar. In some embodiments, multiple grammars may be compressed together to form a single optimized grammar. In such embodiments, multiple grammars would be received at block 202. The grammar(s) may be provided in a variety of different manners within the scope of embodiments of the present invention. By way of example only and not limitation, the grammar may be provided using an XML format to represent the grammar.

The grammar is parsed at block 204 to identify rules within the grammar. Additionally, token classes that make up each rule are identified. If multiple grammars are received, each grammar is parsed to identify the rules and token classes within the grammar.

As shown at block 206, the process continues by identifying important token classes and unimportant token classes. In particular, important token classes are token classes that are considered essential to the grammar such that they will not be considered for compression. Instead, the important token classes are considered as read-only or immutable and will not be changed during compression. In contrast, the unimportant token classes are the token classes that will be considered for purposes of compression. Token classes may be identified as important or unimportant in a variety of different manners within the scope of embodiments of the present invention. For instance, in some embodiments, a token class may be manually identified as important or unimportant based on user input. In other embodiments, a token class may be algorithmically determined to be important or unimportant. For example, token classes may correspond to columns in a underlying database that provides the data. A schema mapping tool may be used to annotate the grammar. In further embodiments, frequency information in patterns and the number of times a token class appears in the grammar may be used to automatically determine whether a token class is important or unimportant. In still further embodiments, a token class may be automatically identified as important or unimportant based on supplementary corpus such as proper names or business names. Those skilled in the art will appreciate that a number of other approaches may be used to identify token classes that should not be compressed and token classes that are suitable for compression.

The unimportant token classes are next analyzed to identify candidates for merging, as shown at block 208. In particular, sets of two or more unimportant token classes are identified as candidates for merging. For instance, a similarity function may be employed to identify similar unimportant token classes. For example, unimportant token classes may be analyzed for similarity such as structural similarity, frequency similarity, design similarity, or user entered similarity function. Those token classes would then be considered as candidates for compression.

A merged token class is generated for each set of two or more unimportant token classes that were identified as candidates for merging, as shown at block 210. For instance, a merged token class may be generated for a set of unimportant token classes by generating a duplicate-free union of the tokens included in each of the unimportant token classes.

As shown at block 212, unimportant token classes that were identified as candidates for merging are replaced with corresponding merged token classes that were generated based on those unimportant token classes. By replacing the unimportant token classes with merged token classes, a compressed grammar is generated.

Figure 3:
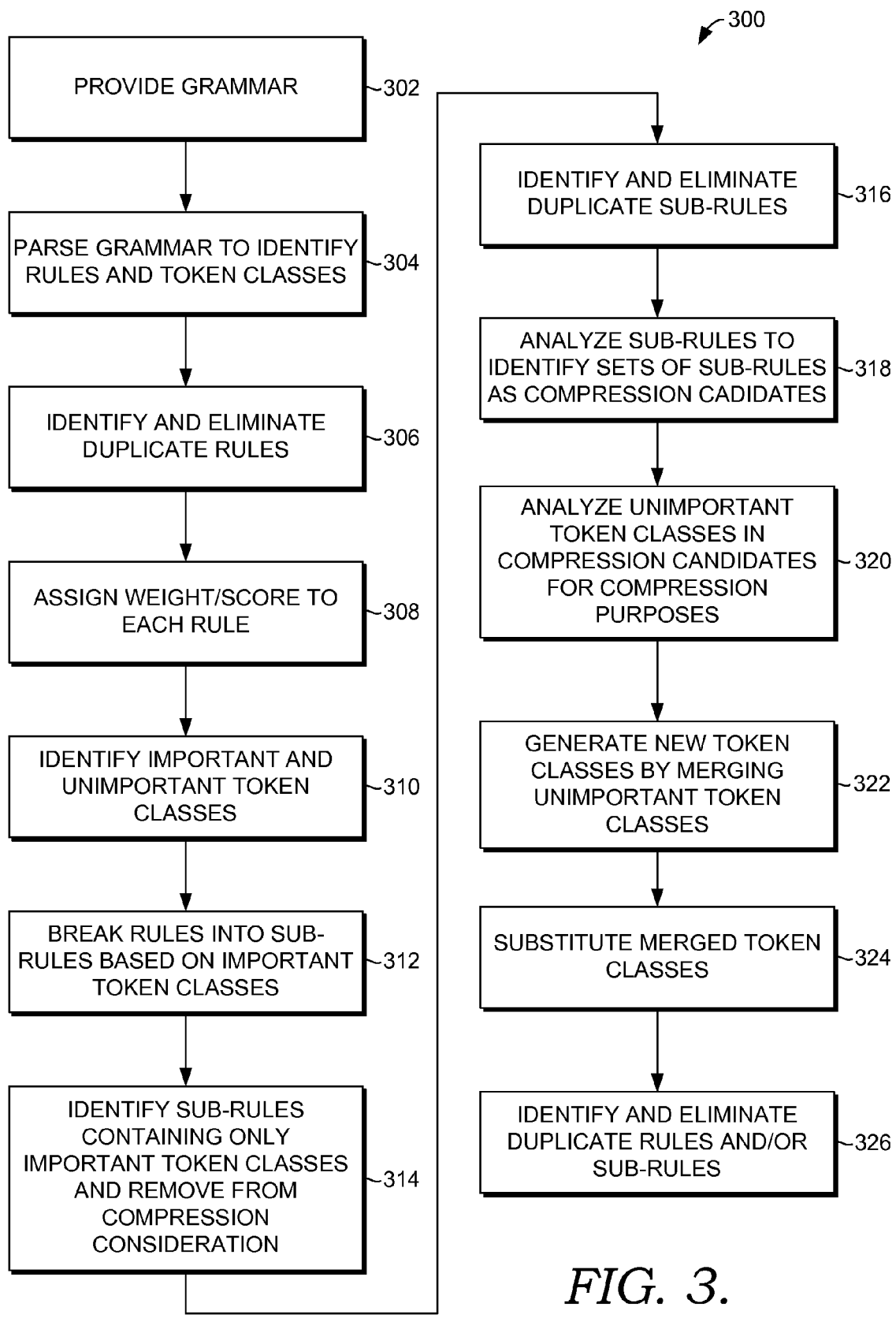
FIG. 3 is a flowchart illustrating a more specified method for compressing a rule-based grammar in accordance with an embodiment of the present invention.

Having described a general overview of how some embodiments of the present invention operate to compress grammars, FIG. 3 provides a flow diagram illustrating a more specific method 300 for compressing grammars in accordance with an embodiment of the present invention. Initially, as shown at block 302, a grammar is provided. As noted previously, the grammar may be a manually-generated grammar or an automatically generated. Additionally, in some embodiments, multiple grammars may be received at block 302 for compression to a single, optimized grammar. The grammar(s) may be provided in a variety of different manners within the scope of embodiments of the present invention. By way of example only and not limitation, the grammar may be provided using an XML format to represent the grammar.

As shown at block 304, the grammar (or grammars) is parsed to identify the rules within the grammar and the token classes making up the rules. In some cases, a grammar may have duplicate rules. Accordingly, any duplicate rules within the grammar are identified and removed at block 306. Duplicate rules include rules having the same token classes in the same order. All but one of the duplicate rules are removed such that the grammar no longer contains any duplicate rules.

As shown at block 308, a weight or score is assigned to each rule. In particular, the weight is indicative of an importance of a rule. The weight may be determined based on the frequency with which a rule corresponds with queries in query logs. In particular, if a particular rule corresponds with a high number of queries, the rule may be deemed to be important such that it should not be compressed. Conversely, if a particular rule does not correspond with a high number of queries, the rule may be deemed to be unimportant and a candidate for compression. In some embodiment, rules that have a weight that indicates a high importance may be removed from consideration for compression.

The token classes are analyzed at block 310 to identify important and unimportant token classes. As discussed previously, important token classes are ones that are not eligible for compression, while unimportant token classes are considered as candidates for compression. In some embodiments, some token classes may be manually identified as being important or unimportant based on user input, and the process takes the manual identification as a given input. In some embodiments, token classes may be automatically or algorithmically determined to be important or unimportant. For instance, statistical filters may be used to identify important and unimportant token classes. In some embodiments, a token class that appears frequently in a grammar may be deemed to be important. In other embodiments, the weight of the rules in which a token class may be used to determine whether the token class is important. For example, suppose a first token class appears in five rules each having a weight of 10, while a second token class appears in ten rules each having a weight of 1. The first token class may be deemed to be more important than the second token class, despite the fact that it appears less frequently in the grammar, because the rules it appears in have a greater weight. The importance of a token class may also be determined based on a grammar's application. For instance, a token class may be important in some applications, while unimportant in others. An important token class may correspond to underlying database information. For example, a token class containing the words "images, pictures, videos" and a token class containing "Michael Jordan". On an application about basketball, "images, pictures, videos" can be an important class for basketball player "Michael Jordan". On the other hand, "Michael Jordan" is also a well know mathematician. So on an application about conferences and research publications, information about images or videos is treated as noise. In addition, sometimes token classes have special semantics when associated with a different class thus making them important. For example, "under, less than" when followed by price (e.g. under $200), must be part of an important token class whereas when followed by a random set of words (e.g. water under the bridge) there is no importance. The domain/application defines what is an important token class, the same classes can be used in different applications but have different meaning on the given application following semantics of application or underlying data presence.

The rules are broken into sub-rules based on the important token classes, as shown at block 312. In particular, each sub-rule begins and ends with an important token class. Additionally, the first and last token class in each rule is treated as being important for purposes of breaking the rule into sub-rules. For instance, suppose that a rule includes the following token classes: <TC1><TC2><TC3><TC4>, and <TC1> and <TC3> are determined to be important token classes. The sub-rules would include: (1) <TC1><TC2><TC3>; and (2) <TC3><TC4>.

Because important token classes are considered read-only and not eligible for compression, there is no compression opportunity for any sub-rule that includes only important token classes. Accordingly, as shown at block 314, sub-rules that contain only important token classes are identified and removed from consideration for compression. Additionally, after breaking rules into sub-rules, it may be determined that there are duplicate sub-rules. As shown at block 316, any duplicate sub-rules are identified and eliminated.

As shown at block 318, sub-rules are analyzed to identify sets of sub-rules that are compression candidates. In one embodiment, sub-rules that have the same starting and ending token classes are identified as a set of sub-rules eligible for compression. In another embodiment, sub-rules that have the same staring token classes are identified as a set of sub-rules eligible for compression. In further embodiments, sub-rules that match a high frequency of queries in query logs may be identified as important and removed from consideration for compression.

After identifying a set of sub-rules that present compressions candidates, the unimportant token classes within the set of sub-rules may be analyzed to determine whether they should be merged, as shown at block 320. In particular, the unimportant token classes may be analyzed using a similarity function to determine whether they should be merged. For example, unimportant token classes may be analyzed for similarity such as structural similarity, frequency similarity, design similarity, or user entered similarity function.

As shown at block 322, new token classes are created by merging unimportant token classes within sets of sub-rules identified as compression candidates. A new token class may be generated by a duplicate-free union of the tokens within the unimportant token classes.

The new or merged token classes are substituted for the unimportant token classes that were used to generate the merged token classes, as shown at block 324. In some embodiments, the merged token classes are substituted only in the sub-rules that triggered the merge. In other embodiments, the merged token classes are substituted in any sub-rule that includes an unimportant token class that was used to generate the merged token class. The latter embodiment reduces the number of token classes, providing a more-compressed grammar, but may also increase the potential for error.

After substituting merged token classes, there may be a number of duplicate sub-rules and/or duplicate rules. The duplicate sub-rules and/or duplicate rules may be identified and eliminated to provide a further compressed grammar, as shown at block 326.

Figure 4:
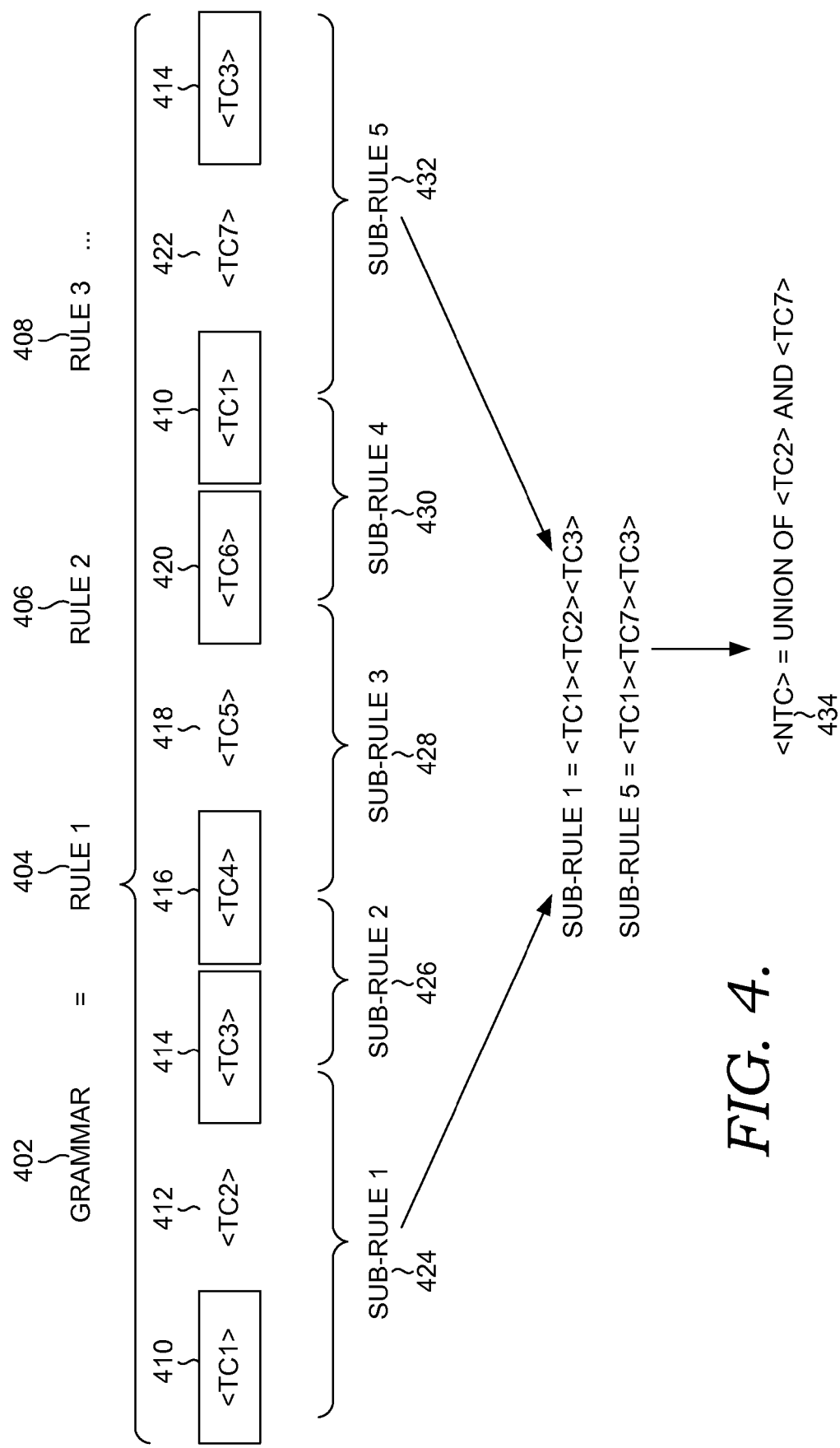
FIG. 4 is a diagram that conceptually illustrates a simplified example of compression of a grammar in accordance with one embodiment of the present invention.

Turning now to FIG. 4, a diagram is provided that conceptually illustrates a simplified compression of a grammar 402 in accordance with one embodiment of the present invention. As shown in FIG. 4, the grammar 402 includes a number of rules, including rule 1 404, rule 2 406, and rule 3 408. Although only three rules are shown in FIG. 4, it should be understood that the grammar may include a substantially larger number of rules.

As described above, the grammar 402 is parsed to identify the rules, and each rule is parsed to identify the token classes within each rule. The example shown in FIG. 4 illustrates the token classes for rule 1 404, which include <TC1> 410, <TC2> 412, <TC3> 414, <TC4> 416, <TC5> 418, <TC6> 420, and <TC7> 422.

The important token classes are next identified. In the present example, the important token classes have been boxed in FIG. 4 and include <TC1> 410, <TC3> 414, <TC4> 416, and <TC6> 420. Rule 1 404 is broken into sub-rules based on the important token classes such that each sub-rule begins and ends with an important token class. As shown in FIG. 4, rule 1 404 is broken into sub-rule 1 424, sub-rule 2 426, sub-rule 3 428, sub-rule 4 430, and sub-rule 5 432. Sub-rule 1 424 includes <TC1> 410, <TC2> 412, and <TC3> 414. Sub-rule 2 426 includes <TC3> 414 and <TC4> 416. Sub-rule 3 428 includes <TC4> 416, <TC5> 418, and <TC6> 420. Sub-rule 4 430 includes <TC6> 420 and <TC1> 410. Sub-rule 5 432 includes <TC1> 410, <TC7> 422, and <TC3> 414.

As described above, sub-rules that include only important token classes are not eligible for compression. Accordingly, sub-rule 2 426 and sub-rule 4 430 would not be eligible for compression since they contain only important token classes. In some embodiments, sets of sub-rules that begin and end with the same token classes are identified as potential compression candidates. In the present example, both sub-rule 1 424 and sub-rule 5 432 begin with <TC1> 410 and end with <TC3> 414. Accordingly, these sub-rules are identified as compression candidates.

As shown in FIG. 4, sub-rule 1 424 includes the unimportant token class, <TC2> 412, while sub-rule 5 432 includes the unimportant token class, <TC7> 422. These unimportant token classes are used to generate a new token class, <NTC> 434, by merging the unimportant token classes. In particular, <NTC> 434 represents a duplicate-free union of the tokens included in <TC2> 412 and <TC7> 422. The new token class, <NTC> 434, is substituted for the token classes that were merged to create the new token class—<TC2> 412 and <TC7> 422. After substituting <NTC> 434, sub-rule 1 424 and sub-rule 5 432 are duplicates as they are both include <TC1> 410, <NTC> 434, and <TC3> 414. Accordingly, one of the sub-rules may be eliminated as a duplicate. By substituting the new token class, <NTC> 434 for the unimportant token classes and eliminating duplicates, a compressed grammar is provided.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combination are of utility and may be employed without reference to other features and sub-combinations. This is contemplated by and is within the scope of the claims.

The invention claimed is:

1. A method for compressing a grammar, the method comprising:
   receiving a grammar to be compressed by using a computer, the grammar comprising a set of rules, each rule comprising a set of token classes, wherein a token class is a logical grouping of tokens, and a token is a string of one or more characters;
   parsing the grammar to identify the set of rules within the grammar and the set of token classes within each rule;
   eliminating, from the grammar, all but one of any duplicate rules identified from parsing the grammar, wherein duplicate rules include rules having the same token classes in the same order;
   identifying, from the set of token classes within each remaining rule, a set of unimportant token classes separate from a set of important token classes, where the set of unimportant token classes are eligible for compression;
   analyzing the set of unimportant token classes to identify two or more token classes within the set of unimportant token classes that are similar;
   merging the two or more token classes within the set of unimportant token classes identified from the currently received grammar to generate a merged token class by removing duplicate tokens and combining remaining tokens from the two or more token classes; and
   substituting the merged token class in the grammar for the two or more token classes that were merged to generate the merged token class to generate a compressed grammar.

2. The method of claim 1, wherein the grammar comprises a manually-generated grammar.

3. The method of claim 1, wherein the grammar comprises an automatically-generated grammar.

4. The method of claim 1, wherein the method compresses multiple grammars to generate the compressed grammar, and wherein receiving a grammar comprises receiving multiple grammars.

5. The method of claim 1, wherein the token class is identified as being important or unimportant based on user input.

6. The method of claim 1, wherein the token class is automatically or algorithmically identified as being important or unimportant.

7. The method of claim 1, wherein analyzing the set of unimportant classes comprises employing a similarity function to identify similar unimportant token classes.

8. The method of claim 1, wherein merging the two or more unimportant token classes from the candidate subset to generate a merged token class comprises generating a duplicate-free union of tokens included in each of the two or more unimportant token classes from the candidate subset.

9. One or more computer-storage media devices embodying computer-useable instructions that, when employed by a computing device, cause the computing device to perform a method comprising:
   receiving a grammar usable by a search engine device to route search queries to corresponding domains of information to find and return information for the search queries, the grammar comprising a plurality of rules, each rule comprising a sequence of token classes, wherein each token class is a logical grouping of tokens, and a token is a string of one or more characters;

parsing the grammar to identify the plurality of rules and token classes;

eliminating, from the grammar, all but one of any duplicate rules identified from parsing the grammar, wherein duplicate rules include rules having the same token classes in the same order;

identifying, from the token classes, two or more unimportant token classes that are eligible for compression and at least one important token class that is not eligible for compression;

breaking at least one rule into a plurality of sub-rules based on important token classes and removing sub-rules containing only important token classes, wherein each sub-rule includes a portion of the token classes from the at least one rule;

analyzing the plurality of sub-rules to identify at least one set of sub-rules as compression candidates, wherein the at least one set of sub-rules contains unimportant token classes;

analyzing the unimportant token classes in the at least one set of sub-rules to identify two or more unimportant token classes for compression;

merging the two or more unimportant token classes in the at least one set of sub-rules identified for compression from the currently received grammar to generate a merged token class by removing duplicate tokens and combining the remaining tokens from the two or more unimportant token classes; and generating a compressed grammar by substituting the merged token class in the grammar for the two or more unimportant token classes that were merged to generate the merged token class.

10. One or more computer-storage media devices embodying computer-useable instructions that, when employed by a computing device, cause the computing device to perform a method comprising:

receiving a grammar usable by a search engine device to route search queries to corresponding domains of information to find and return information for the search queries, the grammar comprising a plurality of rules, each rule comprising a sequence of token classes used to describe search queries, each token class comprising a logical grouping of tokens, each token comprising a string of one or more characters;

parsing the grammar to identify the plurality of rules and token classes;

eliminating, from the grammar, any duplicate rules identified from parsing the grammar;

assigning a score to each rule indicative of an importance of each rule to the grammar, wherein the score for each rule is based at least in part on the frequency with which each rule corresponds with search queries contained in query logs;

identifying one or more rules as important rules based on the one or more rules having a high score indicative of a high importance to the grammar;

removing the one or more important rules from consideration for compression;

identifying, from the token classes, two or more unimportant token classes that are eligible for compression and at least one important token class that is not eligible for compression;

breaking at least one rule into a plurality of sub-rules based on important token classes, wherein each sub-rule includes a portion of the token classes from the at least one rule and each sub-rule begins and ends with an important token class and wherein a beginning token class and ending token class in each rule is treated as an important token class for purposes of breaking each rule into the plurality of sub-rules;

identifying one or more sub-rules containing only important token classes;

removing the one or more sub-rules containing only important token classes from consideration for compression;

eliminating, from the grammar, any duplicate sub-rules identified;

analyzing the plurality of sub-rules to identify at least one set of sub-rules as compression candidates;

analyzing the unimportant token classes in the at least one set of sub-rules to identify two or more unimportant token classes for compression;

merging the two or more unimportant token classes from the at least one set of sub-rules to generate a merged token class;

substituting the merged token class in the grammar for the two or more unimportant token classes that were merged to generate the merged token class; and eliminating any duplicate sub-rules and any duplicate rules after substituting the merged token classes in the grammar to generate a compressed grammar.

11. The one or more computer-storage media devices of claim 10, wherein the grammar comprises at least one of: a manually-generated grammar; and an automatically-generated grammar.

12. The one or more computer-storage media devices of claim 10, wherein the method compresses multiple grammars to generate the compressed grammar, and wherein receiving a grammar comprises receiving the multiple grammars.

13. The one or more computer-storage media devices of claim 10, wherein a token class is identified as unimportant or important based on at least one of the following:

user input identifying the token class as being important or important;

a frequency with which the token class appears in the grammar;

scores of rules in which the token class appears;

underlying data information or additional corpus; and an application to which the grammar is to be used.

14. The one or more computer-storage media devices of claim 10, wherein analyzing the plurality of sub-rules to identify the at least one set of sub-rules as compression candidates comprises identifying a set of two or more sub-rules that begin with the same token class as the other sub-rules in the set.

15. The one or more computer-storage media devices of claim 10, wherein analyzing the plurality of sub-rules to identify the at least one set of sub-rules as compression candidates comprises identifying a set of two or more sub-rules that begin with the same token class as the other sub-rules in the set and end with the same token class as the other sub-rules in the set.

16. The one or more computer-storage media devices of claim 10, wherein analyzing the plurality of sub-rules to identify the at least one set of sub-rules as compression candidates comprises identifying at least one sub-rule as an important sub-rule and removing the important sub-rule from consideration from compression.

17. The one or more computer-storage media devices of claim 16, wherein at least one sub-rule is identified as an important sub-rule based on at least one of the following:
- user input identifying the sub-rule as being important;
- a frequency with which the sub-rule appears in the grammar;
- underlying data information or additional corpus; and
- a frequency with which the sub-rule corresponds with search queries in query logs.

18. The one or more computer-storage media devices of claim 10, wherein analyzing the unimportant token classes in the at least one set of sub-rules to identify two or more unimportant token classes for compression comprises employing a similarity function to identify similar unimportant token classes.

19. The one or more computer-storage media devices of claim 10, wherein merging the two or more unimportant token classes from the at least one set of sub-rules to generate a merged token class comprises generating a duplicate-free union of tokens included in each of the two or more unimportant token classes from the at least one set of sub-rules.

\* \* \* \* \*